(12) United States Patent
Straza

(10) Patent No.: US 8,205,642 B2
(45) Date of Patent: Jun. 26, 2012

(54) FLOW-THROUGH SANDWICH CORE STRUCTURE AND METHOD AND SYSTEM FOR SAME

(75) Inventor: George C. P. Straza, Imperial Beach, CA (US)

(73) Assignee: CellTech Metals, Inc., San Diego, CA (US)

( * ) Notice: Subject to any disclaimer, the term of this patent is extended or adjusted under 35 U.S.C. 154(b) by 1013 days.

(21) Appl. No.: 12/103,635

(22) Filed: Apr. 15, 2008

(65) Prior Publication Data

US 2009/0032110 A1    Feb. 5, 2009

Related U.S. Application Data

(60) Provisional application No. 60/912,104, filed on Apr. 16, 2007.

(51) Int. Cl.
  *F15D 1/04*    (2006.01)
(52) U.S. Cl. ............ 138/39; 138/37; 138/177; 138/173; 165/10; 165/166
(58) Field of Classification Search .................. 138/37, 138/39, 121, 122, 177, 178; 165/10, 166, 165/167
See application file for complete search history.

(56) References Cited

U.S. PATENT DOCUMENTS

| | | | | | |
|---|---|---|---|---|---|
| 2,850,083 | A | * | 9/1958 | Frost | 137/576 |
| 3,489,310 | A | * | 1/1970 | Bohme et al. | 220/4.12 |
| 3,804,292 | A | * | 4/1974 | Chiti | 220/88.3 |
| 4,015,954 | A | * | 4/1977 | Reed | 48/192 |
| 4,366,608 | A | * | 1/1983 | Nagaoka | 29/890.141 |
| 2002/0117224 | A1 | * | 8/2002 | Vakili | 138/39 |

FOREIGN PATENT DOCUMENTS

| | | |
|---|---|---|
| CA | 1316642 | 4/1993 |
| EP | 1 748 270 A1 | 1/2007 |
| GB | 996805 | 7/1960 |
| GB | 2 182 703 A | 5/1987 |
| JP | 07032133 | 2/1995 |
| JP | 2001255090 | 9/2001 |
| WO | WO 02/057700 A1 | 7/2002 |

* cited by examiner

*Primary Examiner* — Patrick F Brinson
(74) *Attorney, Agent, or Firm* — Paul Davis; Goodwin Procter LLP

(57) ABSTRACT

Methods and apparatus for transmitting a fluid through the core of a metal sandwich structure. Improved metal sandwich sheet structures include a formed metal core that is brazed, welded, or bonded to two outer flat metal sheets at a series of interleaving surface regions. The inventor has recognized that fluids (e.g., liquid and/or gaseous substances) can be transmitted through the cavities of these structures in order to accomplish thermal conduction or as a means of servicing particular regions of a building, vehicle, device, or other work of construction.

11 Claims, 15 Drawing Sheets

FLOW-THROUGH SANDWICH CORE STRUCTURE AND METHOD AND SYSTEM FOR SAME

CROSS-REFERENCE TO RELATED APPLICATIONS

This application claims the benefit of U.S. provisional application Ser. No. 60/912,104 filed Apr. 16, 2007 entitled "FLOW-THROUGH SANDWICH CORE STRUCTURE AND METHOD AND SYSTEM FOR SAME," which is incorporated herein by reference in its entirety.

BACKGROUND OF THE INVENTION

Technical Field

The present invention relates generally to metal sandwich sheet structures. More particularly, the present invention is directed in one exemplary aspect to systems and methods for transmitting fluidic substances though the core of metal sandwich sheet structures.

BRIEF SUMMARY OF THE INVENTION

Improved metal sandwich sheet structures include a formed metal core that is brazed, welded, or bonded to two outer flat metal sheets at a series of interleaving surface regions. Micro-abrasions formed within these regions enable the metal core to couple with the outer sheets in a manner that both preserves structural alignment and increases resistance to delamination. Since the improved metal sandwich sheet structures are capable of being formed into complex shapes while retaining their structural integrity, these structures are expected to replace traditional metal structures and ultimately attain widespread industrial use.

The inventor has herein recognized that liquid and/or gaseous substances can be transmitted through the core of these structures to serviceable regions of a building, vehicle, device, or other work of construction. For example, in one embodiment, jet fuel is transmitted through the core of a metal sandwich sheet structure that has been formed into the wing of an aircraft. In another embodiment, heated air is transmitted to a specific room in a building. In still another embodiment, coolant is transmitted to the engine compartment of an automobile.

Hence, by using contiguous regions of the cellular cavities comprised within the core of the sandwich structure as a channel for transmitting liquid and/or gaseous substances, a wide range of pipes, vents, flow channels, and other conduits thereby become obviated. In newer designs, this translates into increased savings and frees designers from many of the constraints typically associated with having to provide such conduits within their system. In existing systems, the additional channels afforded can serve to increase the volume of the substance provided to the serviceable region.

As will be readily appreciated, the present invention has applicability to any system which implements one or more conduits and/or channels of flow. This includes, without limitation, automobiles, aircraft, medical devices, agricultural equipment, thermal devices, military equipment, household appliances, and industrial machinery.

In a first aspect of the invention, a method of directing fluid through an apparatus is disclosed. In one embodiment, the method comprises: directing a fluid through at least one inlet located at a first end of a metal sheet sandwich structure; and ejecting the fluid out of at least one outlet located at a second end of the metal sheet sandwich structure; wherein the metal sheet sandwich structure comprises at least one formed metal core layer sandwiched between two outer metal sheet layers so as to form one or more conduits between the two outer metal sheet layers through which the fluid flows, and wherein the metal sheet sandwich structure forms at least a portion of an outer housing or body member of the apparatus.

In a second aspect of the invention, a method of circulating a substance through an apparatus is disclosed. In one embodiment, the method comprises: introducing a substance into one or more cellular cavities comprised within a metal sheet sandwich structure; and circulating the substance within the metal sheet sandwich structure; wherein the metal sheet sandwich structure comprises at least one formed core element sandwiched between two outer metal sheet layers so as to form a plurality of cellular cavities through which the substance flows, and wherein the metal sheet sandwich structure forms at least a portion of an outer housing or body member of the apparatus.

In a third aspect of the invention, an apparatus is disclosed. In one embodiment, the apparatus comprises: a pressure module adapted to apply pressure to a substance; and a conduit coupled to the pressure module and adapted to transmit the substance to a serviceable region; wherein the conduit comprises a plurality of interleaving cellular cavities situated within a metal sheet sandwich structure; wherein the metal sheet sandwich structure comprises at least one formed metal core layer sandwiched between two outer metal sheet layers.

BRIEF DESCRIPTION OF THE DRAWINGS

FIG. 16b is a cross-sectional view of the structure depicted in FIG. 16a.

FIG. 18b is a cross-sectional view of the sandwich structure depicted in FIG. 18a.

FIG. 21b is a cross-sectional view of the nozzle system depicted in FIG. 21a.

DETAILED DESCRIPTION OF EXEMPLARY EMBODIMENTS

Preferred embodiments of the invention are described in detail below with reference to the figures wherein like elements are referenced with like numerals throughout. It is understood that the figures are not necessarily drawn to scale but intended to merely illustrate some of the novel aspects, features and processes of the invention.

Note that in the following discussion, FIGS. 1-15 relate generally to components, aspects, embodiments, and methods of manufacturing metal sandwich sheet structures adapted for use in various embodiments of the present invention, while FIGS. 16-21 relate generally to systems and methods for accomplishing substance flow within these and other structures.

Figure 1:
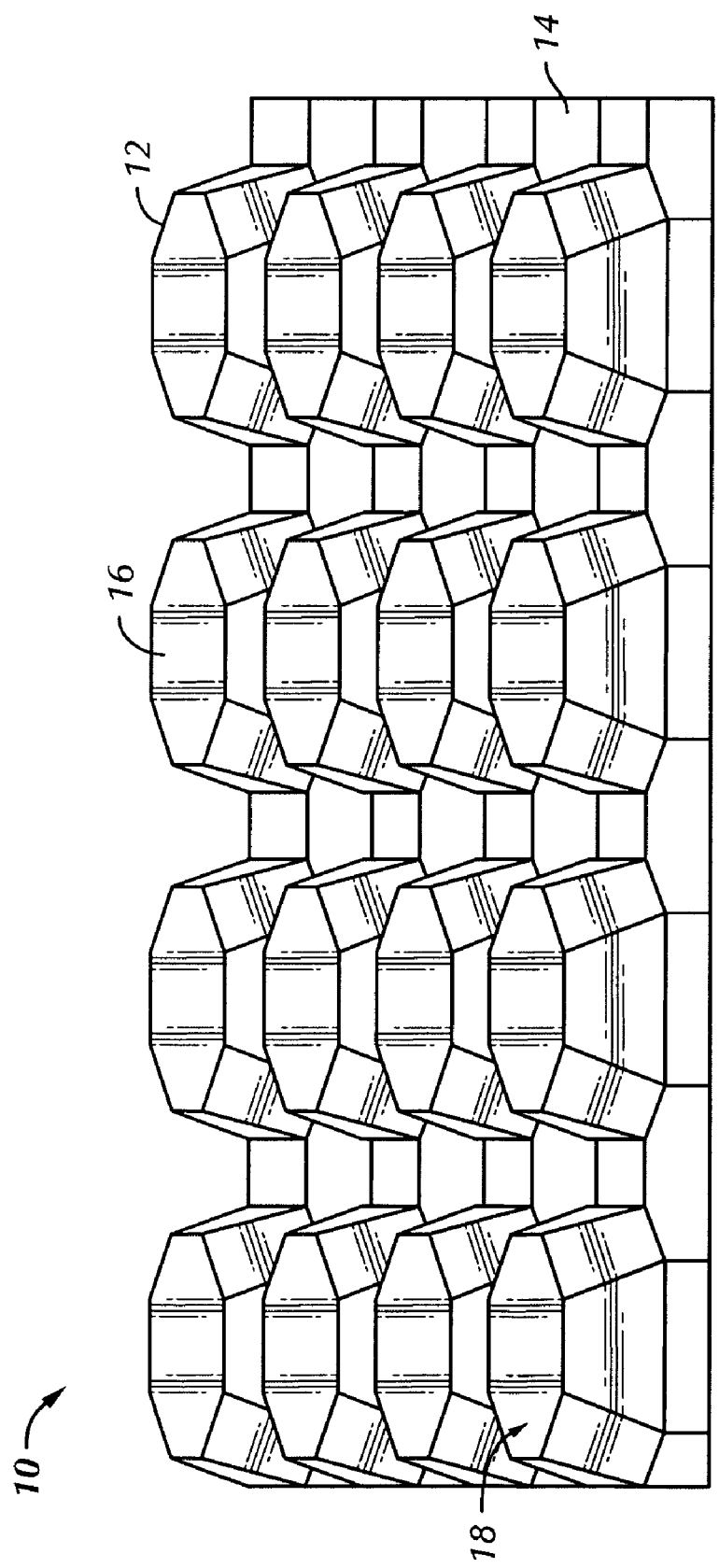
FIG. 1 is a perspective view of a formed metal core sheet according to one embodiment of the invention.

FIG. 1 illustrates a perspective view of a formed metal core 10 made in accordance with one embodiment of the invention. In this embodiment, the metal core 10 is formed in a corrugated pattern having a plurality of cells 12 comprising alternating front and rear projections extending outwardly in front of and behind a median plane 14, with each projection having a bonding surface area or land 16 configured to be brazed or bonded with corresponding external metal sheets (not shown) on both sides of the median plane 14. As shown in FIG. 1, a plurality of micro-abrasions or indentions 18 are formed on the bonding lands 16. As explained in further detail below, the micro-abrasions 18 provide stronger brazing joints to be formed between the metal core 10 and the external metal sheets by facilitating improved capillary action by the metal core 10 during the brazing process.

Figure 2A:
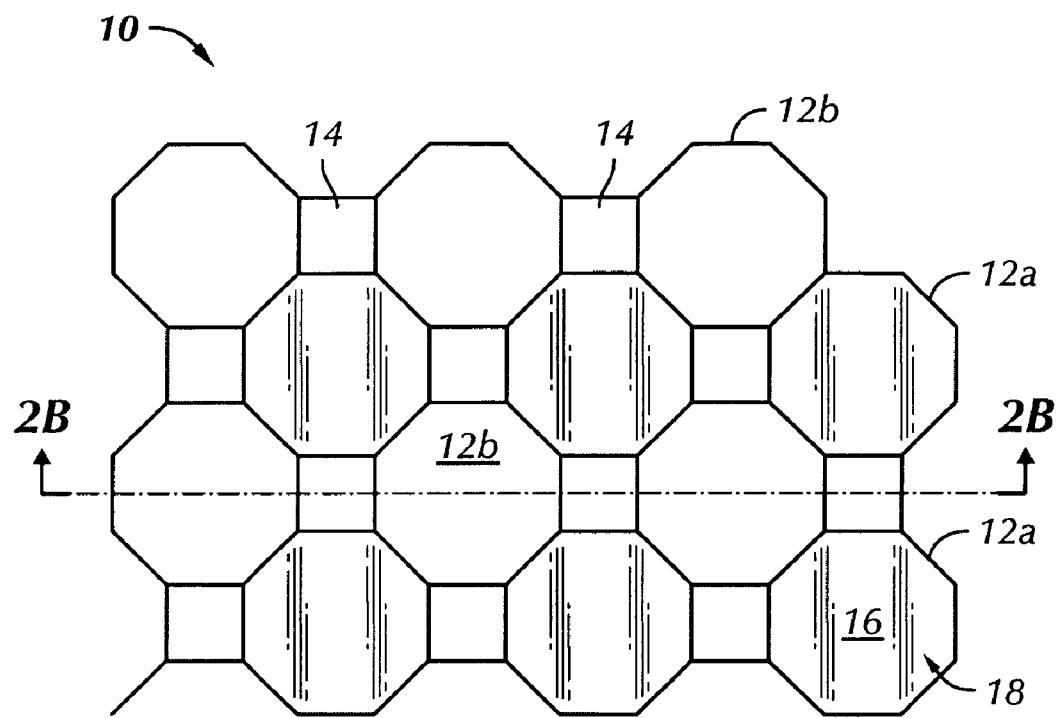
FIG. 2A is a top view of the formed metal core sheet that is depicted in FIG. 1.

FIG. 2A illustrates a top view of the formed metal core 10 of FIG. 1. The metal core 10 includes a plurality of upwardly projecting cells 12A and a plurality of downwardly projecting cells 12B. The bonding lands 16 of the upwardly projecting cells 12A are also shown while the bonding lands 16 of the downwardly projecting cells 12B are located on the opposite side of the core 10 and, hence, not shown in FIG. 2A. A plurality of micro abrasions or indentions 18 are formed on the bonding lands 16 of each cell 12A and 12B to facilitate improved capillary action of the metal core 10 during brazing.

Figure 2B:
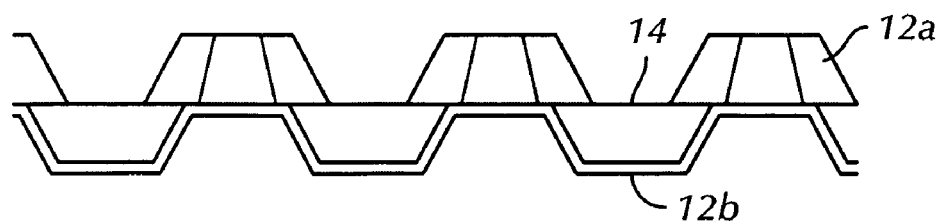
FIG. 2B is a cross-sectional view of the formed metal sheet of FIGS. 1 and 2A as taken along lines 2B-2B of FIG. 2A.

FIG. 2B illustrates a cross-sectional side view of the metal core 10 taken along perspective lines 2B-2B of FIG. 2A. As shown in FIGS. 1, 2A and 2B, in one embodiment, each cell 12A and 12B is formed in the shape of an octagon. However, it is understood that the invention is not limited to any particular shape, size and/or configuration of the cells 12A, 12B. Any desired shape, size and configuration of cells may be utilized to achieve various desired physical characteristics of the resulting metal core sandwich structure, in accordance with the present invention.

Figure 3A:
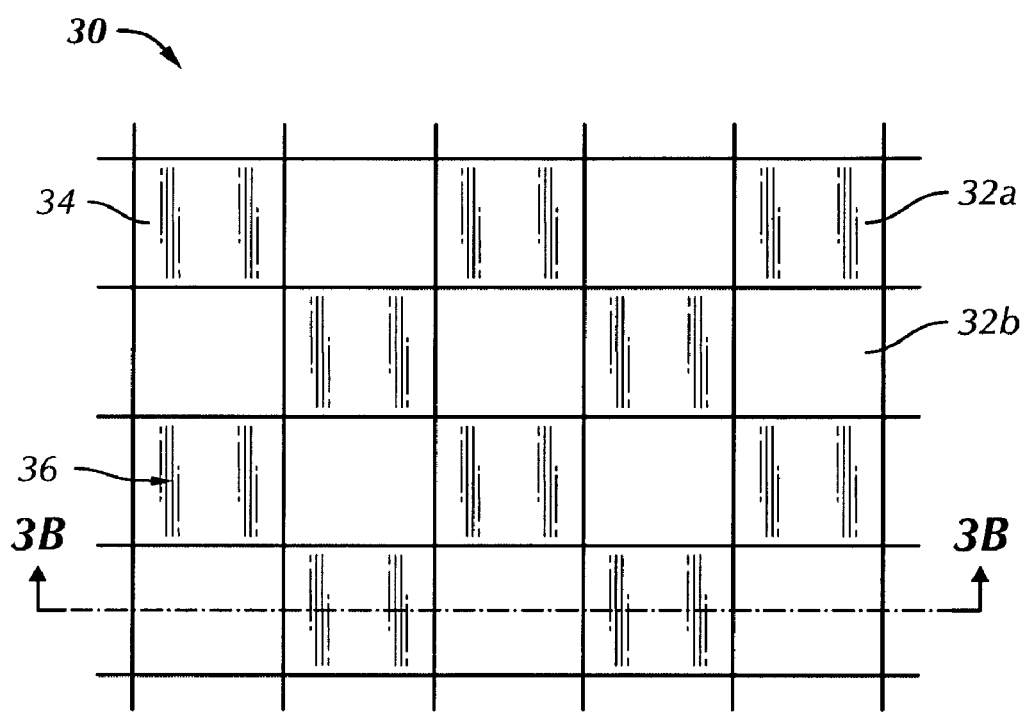
FIG. 3A is a top view of a metal core sheet formed in a corrugated checker-board pattern according to one embodiment of the invention.
Figure 3B:
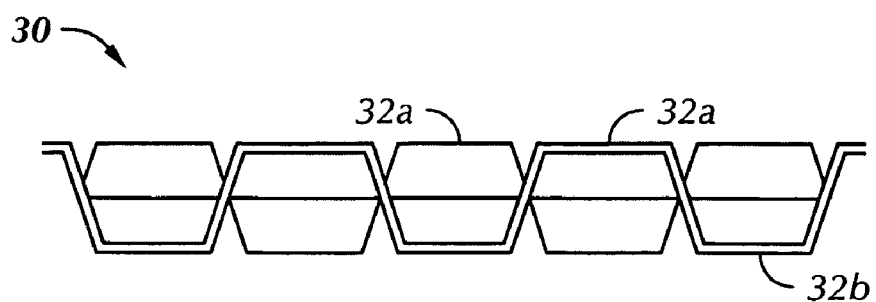
FIG. 3B is a cross-sectional view of the formed metal core of FIG. 3A as taken along lines 3B-3B of FIG. 3A.

FIG. 3A illustrates a top view of an alternative, exemplary formed metal core 30 having a plurality of square-shaped cells 32A and 32B in a checkerboard configuration. The cells 32A represent upwardly projecting cells and the cells 32B represent downwardly projecting cells. Each cell 32A and 32B has a corresponding bonding land 34 and a plurality of micro-abrasions 36 on the surface of each bonding land 34. FIG. 3B illustrates a cross-sectional side view of the formed metal core 30 of FIG. 3A, taken along lines 3B-3B of that figure.

Figure 4:
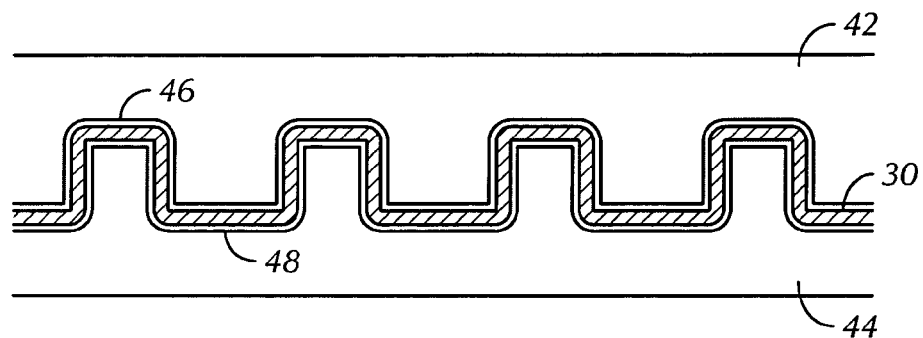
FIG. 4 is a side view of a metal core sheet formed between two press plates or molds according to one embodiment of the invention.

FIG. 4 illustrates a cross-sectional side view of the metal core 30 as it is formed between two presses 42 and 44 having corresponding molded patterns and configurations to form the metal core 30 into a desired shape and configuration. During forming, a flat sheet of metal material 30 is placed between the top and bottom presses 42 and 44, respectively. As the top and bottom presses 42 and 44 are pressed together the metal core 30 is formed via stretching and/or gathering of the metal sheet material 30 to form the cells 32A and 32B in a checkerboard configuration. It is understood that the presses 42 and 44 are exemplary only and that presses having other desired molded patterns and configurations may be utilized to form a metal core having cells of various shapes (e.g., octagons, hexagons, pentagons, squares, triangles, etc.), and sizes, and configurations.

In one embodiment, the micro-abrasions 36 illustrated in FIG. 3A, for example, are formed during pressing of the metal core 30. A plurality of micro-protrusions, ridges and/or lines (collectively referred to herein as "micro-protrusions") (not shown) are provided on selected surfaces 46 and 48 of top and bottom presses 42 and 44, respectively. During pressing of the metal core 30, the micro-protrusions form the plurality of micro-abrasions 36 on the bonding lands 34 of the cells 32A, 32B of the formed metal core 30. In one embodiment, the micro-protrusions are formed on the surfaces of the presses 42 and 44 corresponding to the bonding lands 34 of the formed metal core 30. In one embodiment, the micro-protrusions are formed on the corresponding press surfaces by fine etching of press surfaces using known means and techniques (e.g., electrical metal etching, chemical etching, sand blasting, grit blasting, etc.). In one embodiment, the micro-protrusions are formed so as to provide micro-abrasions 36 having a depth and/or width of 0.0005 inches to 0.002 inches and cover approximately 50-80% of the surface area of the bonding lands 34. In various embodiments, the abrasions 36 may be substantially parallel channels, criss-cross configurations, or channels traveling in random directions and/or curved channels. In alternative embodiments, the micro-abrasions may be formed by electronic discharge machining (EDM) processes, which are well-known in the art. In other embodiments, the micro-abrasions 36 may be formed on the bonding lands 34 of the metal core 30 after the metal core 30 has been pressed and formed. It is appreciated, however, that providing presses 42 and 44 with preformed micro-protrusions that automatically form micro-abrasions 36 on the metal core 30 during pressing can save substantial time and work when compared to forming the micro-abrasions 36 manually or individually for each metal core 30 subsequent to pressing.

In alternative embodiments, the metal core 10, 30 may be formed after a brazing material has been placed on each side of the core 10, 30. Thus, the metal core sheet, plus brazing material on each side of the metal core sheets, are pressed and formed together by the presses 42 and 44. The brazing material can be placed onto the surface of the metal core 10, 30 prior to forming the core 10, 30 by spraying a brazing powder onto the core sheet to be formed or by placing sheets of brazing material 50 on either side of the core sheet to be formed. With the proper amount of pressure during forming, the brazing material will be embedded into the core sheet. This facilitates the subsequent brazing process by evenly distributing the braze material across the surface of the core sheet to be formed. In these embodiments, the micro-abrasions 18, 36 are formed and pass through the brazing material onto the bonding lands 16, 34 of the formed metal core 10, 30. Thereafter, the formed metal core 10, 30 plus formed brazing material sheets are sandwiched between two external metal sheets and brazed at high temperature (e.g., 670 to 730 degrees Celsius) in a reduced-atmosphere or vacuum furnace to produce a metal core sandwich structure in accordance with the present invention.

Figure 5:
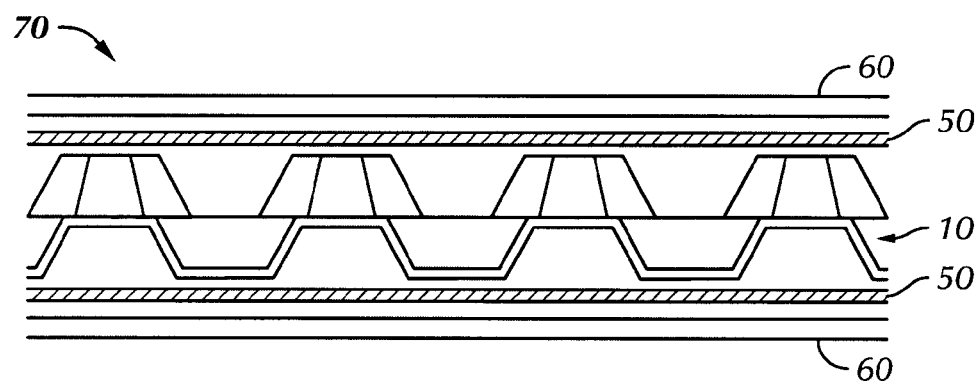
FIG. 5 is an exploded side view of a metal core sandwich structure prior to brazing according to one embodiment of the invention.
Figure 6:
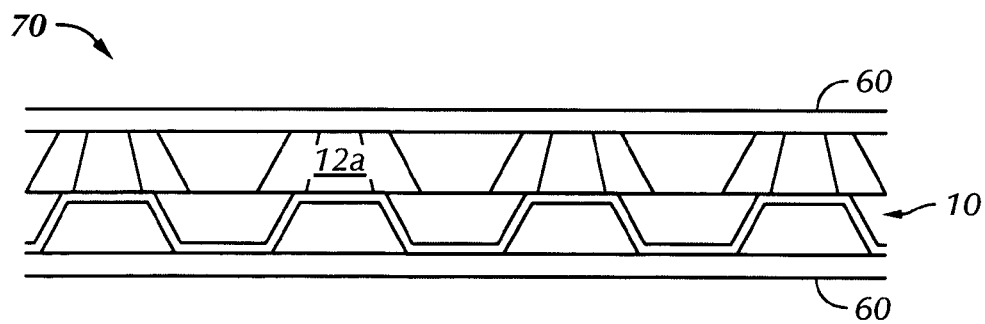
FIG. 6 is an exploded side view of the metal core sandwich structure of FIG. 4 after brazing.

FIG. 5 illustrates an exploded cross-sectional side view of an exemplary formed metal core 10 (FIG. 1) sandwiched between two sheets of brazing material 50, which are in turn sandwiched between two external metal sheets 60. In this embodiment, the brazing material sheets 50 have not been pressed and formed with the metal core 10, as described above. FIG. 6 illustrates a cross-section side view of the resulting metal core sandwich structure 70 after brazing of the metal core 10 to the external metal sheets 60 has been completed. The micro-abrasions 18 (FIG. 2A) allow for an improved capillary effect so that the brazing material 50, upon melting, flows into the pores of the bonding lands 16 (FIGS. 1 and 2A) more easily and thereby provides a stronger braze joint between the closely fitted surfaces of the bonding lands 16 and the external metal sheets 60. The improved capillary effect and, hence, improved brazing joint provided by the micro-abrasions 18 produce a stronger metal core sandwich structure 70 that can be formed into compound curves, and other shapes and forms, more easily without delaminating, wrinkling or otherwise losing its structural integrity. In further embodiments, micro-abrasions may also be formed on the interior surface of the external metal sheets 60 in order to improve the capillary effect of the external metal sheets 60 during brazing.

In a further embodiment of the invention, prior to brazing, all of the layers of the metal sandwich structure 70, comprising a formed metal core 10, brazing material sheets 50 and two outer metal sheets 60, are electro-tack-welded together so as to secure the multiple layers to one another and prevent relative movements during the brazing process. This further improves the strength of the braze joints formed between the bonding lands 16 of the core 10 and the external metal sheets 60 to provide a higher quality finished product.

Figure 7:
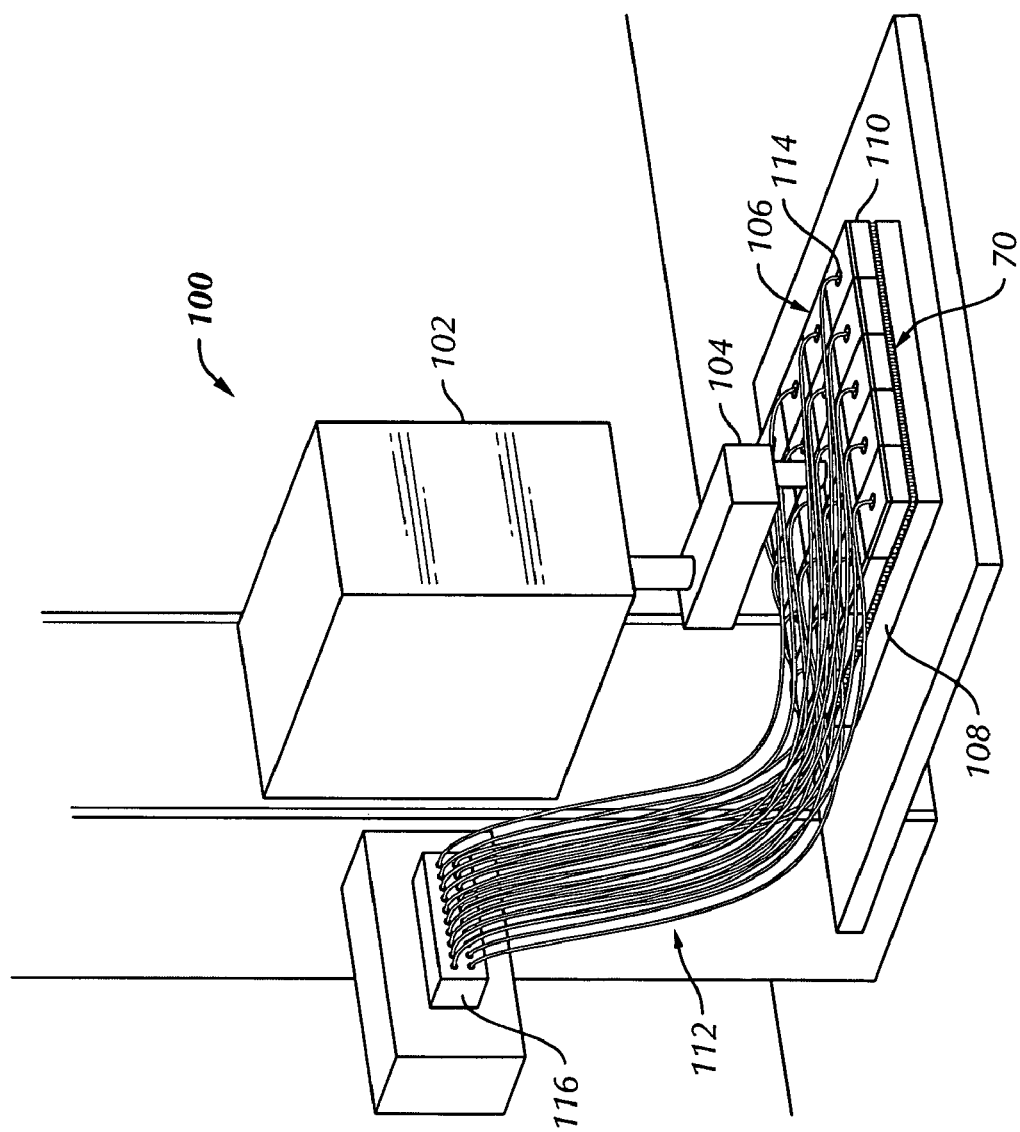
FIG. 7 is a perspective view of an electro-tack welding apparatus that is useful with various embodiments of the present invention.

FIG. 7 illustrates a perspective view of a novel tack welding apparatus 100 that may be used in conjunction with the present invention. The apparatus 100 includes a computer and/or electronically controlled actuator box 102 that contains standard electronics and mechanical components (e.g., gears, switches, power supply, etc.) to control movement of an actuator arm 104 that controls movement of a top plate 106. The metal core sandwich structure 70 (FIGS. 5 and 6) is positioned between the top plate 106 and a bottom ground plate 108. As shown in FIG. 7, the top tack-welding plate 106 comprises a plurality of subsections 110 that are electrically insulated from each other. In one embodiment, the subsections 110 can be made from copper or copper-alloy and are insulated from one another by an insulating material (e.g., ceramic). Each of the subsections 110 are electrically coupled to a corresponding conductive wire 112 via corresponding contacts 114. The conductive wires 112 are coupled to a power switch box 116 that controls when electrical current is supplied to each individual wire 112. The power switch box 116 can be controlled by a computer or processor (not shown).

In one embodiment, a high energy, low voltage current is sequentially applied to each subsection 110 to tack-weld a corresponding portion of the metal core sandwich structure 70 located between the corresponding subsection 110 and the bottom ground plate 108. In one embodiment, the top and bottom plates 106 and 108, respectively, apply an even pressure throughout the sandwich structure 70. A sequence of tack welds are rapidly performed in different areas of the sandwich structure 70 by sequentially applying an electrical current to each subsection 110 of the top plate 106. By sequentially tack-welding only portions of the sandwich structure 70 at any one time, this tack-welding process allows for controlled heating and cooling throughout the sandwich structure 70, which in turn allows for improved tack welds. Thus, portions of the sandwich structure 70 following tack-welding are allowed to cool while other portions are being tack-welded. This cooling process provides better tack-welds and the resulting sandwich structure 70 has a lower tendency to delaminate at individual tack welds. In other words, letting the structure 70 heat up and cool in different areas as it is being tack welded helps prevent individual tack welds from separating. After the metal core sandwich structure 70 has been tack welded together, as described above, the structure 70 is then placed in a furnace for brazing.

The metal core sandwich structure 70 may incorporate any type of metal and/or metal alloys as the formed core 10, 30 and the external metal sheets 60, such as A1 or D2 steel, for example. It is understood that any metals, metal alloys, or combinations thereof, that are suitable for brazing are contemplated to be within the scope of the present invention (e.g., copper, aluminum, titanium, etc.). Additionally, any type of known brazing material in the form of sheets, foils, sprays, powders, paste or slurries, for example, may be utilized in accordance with the present invention. Furthermore, it is contemplated that some embodiments of the invention may utilize non-metal core materials and non-metal external sheets. For example, known synthetic and/or polymer materials (e.g., Kevlar) may be used to form an injection-molded core and thereafter bonded (e.g., sonically welded and/or vibration welded) to synthetic and/or polymer outer sheets. Micro-abrasions are formed on the bonding lands of the non-metal core which facilitate gripping between the core and the external sheets during and after welding.

Further embodiments of metal core sandwich structures may include using a double cell sandwich core. These embodiments also have two external sheets defining a central core; but, instead of using a single core sheet (such as sheet 10 of FIG. 6), exemplary embodiments of double cell sandwich structures may use two core sheets.

Figure 8:
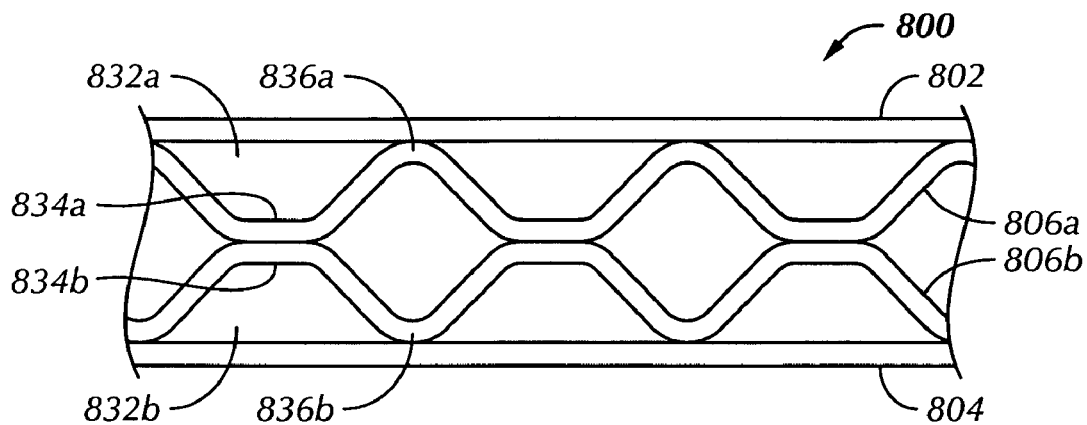
FIG. 8 is a cross-sectional view of a double cell sandwich structure according to one embodiment of the present invention.

One embodiment of a double cell sandwich structure 800 is shown in FIG. 8. Double cell sandwich structure 800 can comprise external sheets 802 and 804 sandwiching a first core sheet 806a and a second core sheet 806b. External sheets 802 and 804 may be the same as sheets 60 shown in FIG. 6. First core sheet 806a and second core sheet 806b may be made of the same materials as detailed above with reference to core sheet 10. In the embodiment 800, the first core sheet 806a and the second core sheet 806b comprise a plurality of pyramid-shaped cells 832a, 832b.

Further to FIG. 8, inwardly projecting lands 834a of the first sheet 806a contact corresponding inwardly projecting lands 834b of the second sheet 806b. In addition, outwardly extending lands 836a of the first sheet 806a contact an interior side of the external sheet 802 and outwardly extending lands 836b of the second sheet 806b contact an interior side the external sheet 804. The inwardly projecting landings 834a of the first sheet can be configured to be brazed or bonded with corresponding inwardly facing landings 834b of the second sheet. Moreover, outwardly facing landings 836a and 836b of the first sheet and the second sheet, respectively, can be configured to be brazed or bonded with the interior surface of corresponding external metal sheets 802 and 804. It is understood that any brazing or bonding technique described above may be similarly used with the lands 834 and 836 and external sheets 802 and 804 to facilitate gripping between the core sheets and the core sheets and external sheets. In one embodiment, micro-abrasions 18 are formed on a plurality of lands 834 and/or 836 to improve capillary action during the brazing process.

Figure 9:
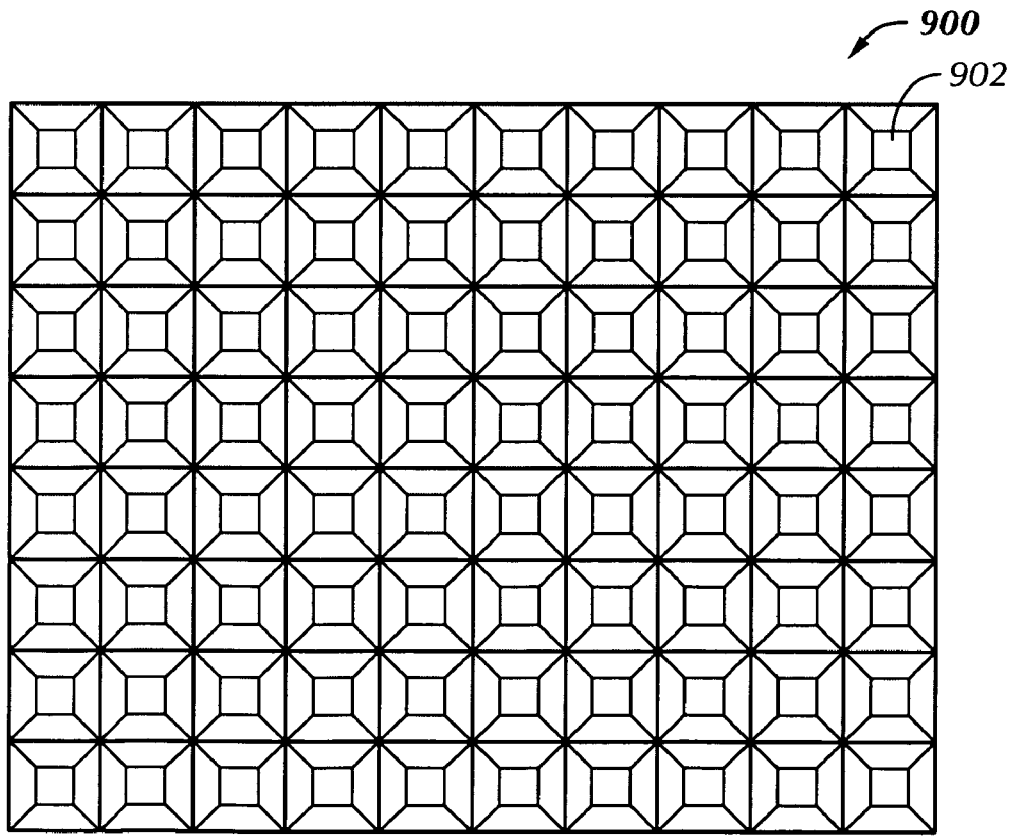
FIG. 9 is a top view of a press plate used in the embodiment depicted by FIG. 8.

FIG. 9 illustrates a top view of a press 900 configured to press or mold core sheets 806a and 806b, in accordance with one embodiment of the present invention. Press 900 has corresponding molded patterns, such as punch 902, and configurations to form the cores sheets 806a and 806b. During forming, a flat sheet of metal material can be placed between the top press 900 and a corresponding bottom press (not shown). As the top press 900 and the bottom press are pressed together, a core sheet is formed via stretching and/or gathering of the metal sheet. It is understood that press 900 is exemplary only and that presses having other desired molded patterns and configurations may be used to form metal core sheets having cells of various shapes, sizes and configurations.

Figure 10:
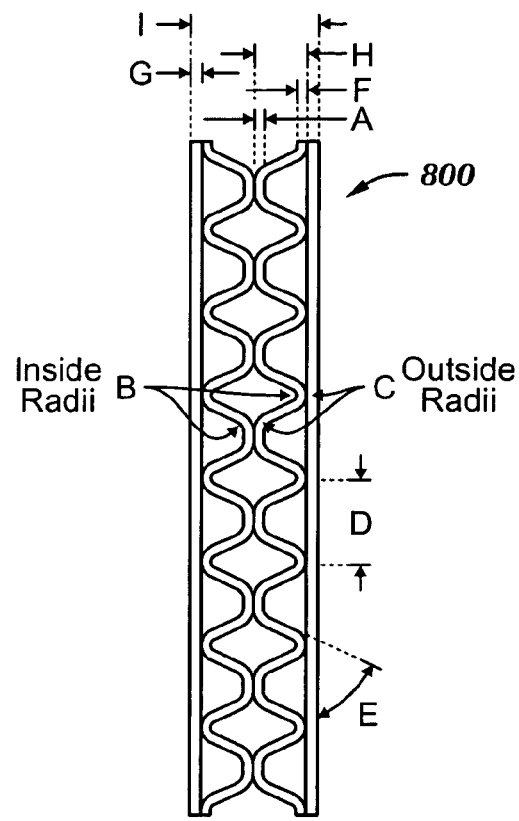
FIG. 10 is a cross-sectional view of the embodiment depicted by FIG. 8 showing exemplary dimensions.

FIG. 10 is a cross-sectional view of structure 800 showing exemplary dimensions of the structure 800. The exemplary dimensions are as follows: an inwardly projecting landing thickness A=0.0040"; an inside radii B=0.0006"; an outside radii C=0.010"; a cell diameter D=0.050"; a cell incline E=70°; an outwardly projecting landing thickness F=0.0040"; an external sheet thickness G=0.0060"; a core sheets width H=0.0300"; and a sandwich cell structure width I=0.0720". It is understood that the above dimensions are exemplary only and that a sandwich core structure having other sizes and configurations may be used as desired to fit the needs of a particular application.

Figure 11:
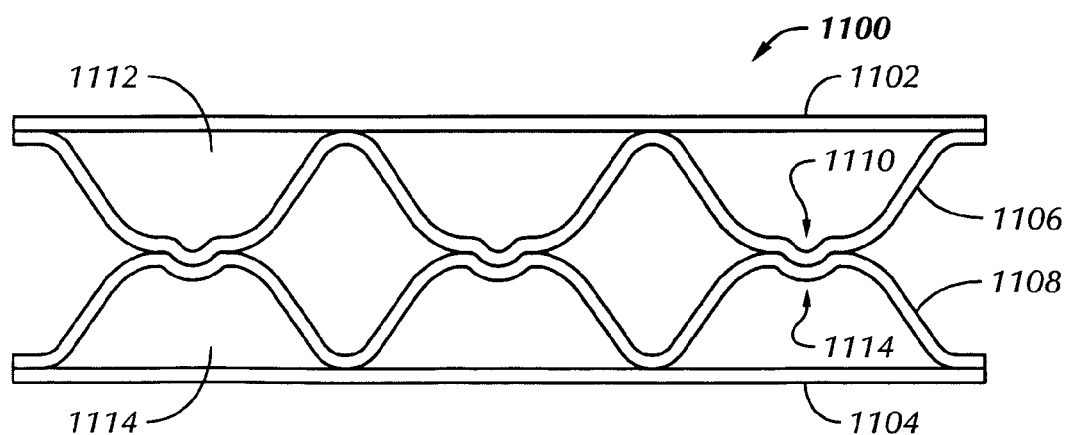
FIG. 11 is a cross-sectional view of a double cell sandwich structure according to another embodiment of the present invention.

FIG. 11 is a cross-sectional side view of a further embodiment of a double cell sandwich structure 1100. Structure 1100 has external sheets 1102 and 1104 sandwiching first core sheet 1006 and second core sheet 1108. The first core sheet 1006 has a generally sinusoidal cross-sectional shape with a bulge 1110 located at a tip of each inwardly projecting peak 1112. The second core sheet 1108 also has a generally sinusoidal cross-sectional shape, but has a dimple 1114 located at a tip of each inwardly projecting peak 1116. As seen in FIG. 11, the bulges 1110 sit in the corresponding dimples 1114.

The bulges 1110 and dimples 1114, as well as area near the bulges and dimples, may be brazed or bonded to facilitate gripping with a corresponding surface. Moreover, outwardly facing landings 1118a and 1118b of the first sheet 1106 and the second sheet 1108, respectively, can be configured to be brazed or bonded with the interior surface of corresponding external metal sheets 1104 and 1102. As is appreciated, any suitable brazing or bonding technique described in this disclosure may be used. In one embodiment, micro-abrasions 18 are formed on respective surfaces to improve capillary action during the brazing process.

Similar to embodiments described above, the first core sheet 1106 and the second core sheet 1108 may be formed between two presses having corresponding molded patterns and configurations to form a flat metal sheet into the desired shape and configuration.

Figure 12A:
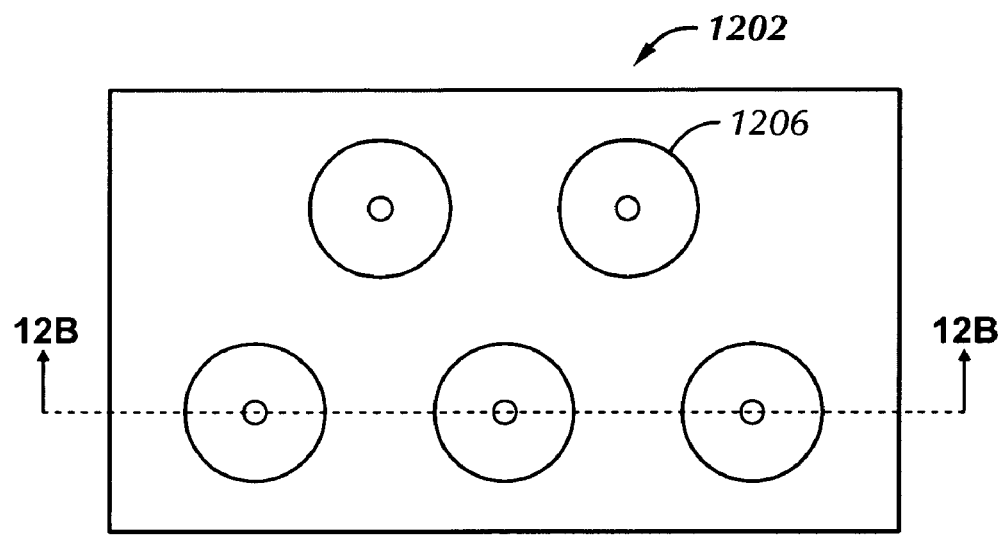
FIG. 12a is a top view of an upper press used to form a first core sheet used in the embodiment illustrated by FIG. 11.

FIG. 12a is a top view of an upper press 1202 having a plurality of pins 1206 for forming the first core sheet 1006. In one embodiment, pins 1206 are spaced an equal distance away from each adjacent pin 1206. In a further embodiment, partial pins that would otherwise be located at edges of the press 1202 are eliminated. This is believed to help avoid sharp edges which could cut the material being formed. Only five pins 1206 are shown in FIG. 12a for ease of understanding for the reader. As is appreciated, there is no limit as to the number of pins 1206 that can be used.

Figure 12B:
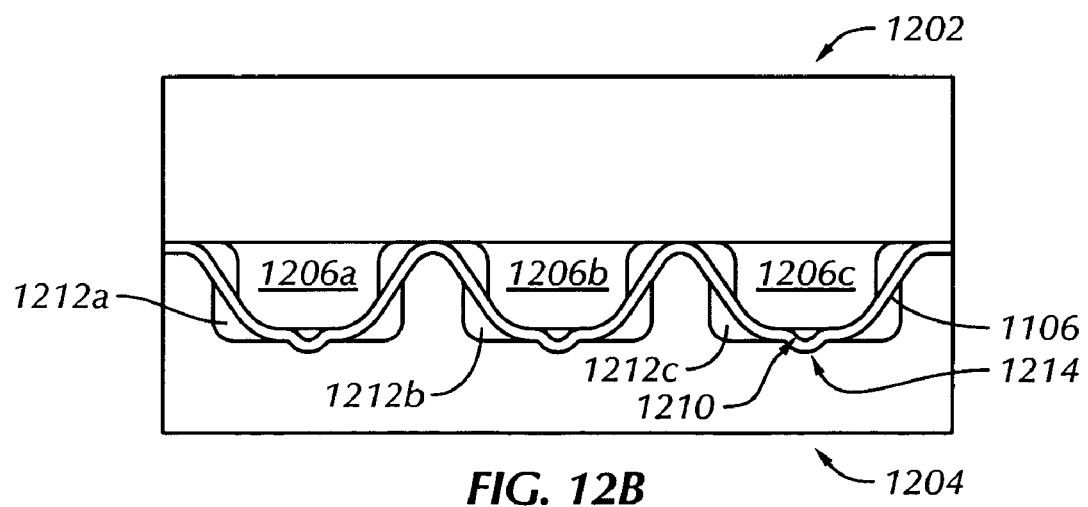
FIG. 12b is a cross-sectional view of the upper press depicted in FIG. 12 and a lower press that is used to form a first core sheet according to one embodiment of the present invention.

FIG. 12b illustrates the cross-sectional side view of the upper press 1202, taken along the lines 12b-12b of FIG. 12a, and lower press 1204 forming the first core sheet 1106 in accordance with one embodiment of the present invention. As can be seen, pins 1206a, 1206b, 1206c have a generally conical shape and extend outwardly from a baseline 1208 of the upper press 1202. Located at a tip of each pin 1206a, 1206b, 1206c is a projection 1210. The lower press 1204 has a plurality of conically-shaped cavities 1212a, 1212b, 1212c, each cavity 1212 having an indentation 1214 located at a central bottom area of each cavity 1212. Pins 1206a, 1206b, 1206c extends into respective cavities 1212a, 1212b, 1212c when the upper press 1202 and lower press 1204 are pressed together to form the first core sheet 1106.

Figure 13A:
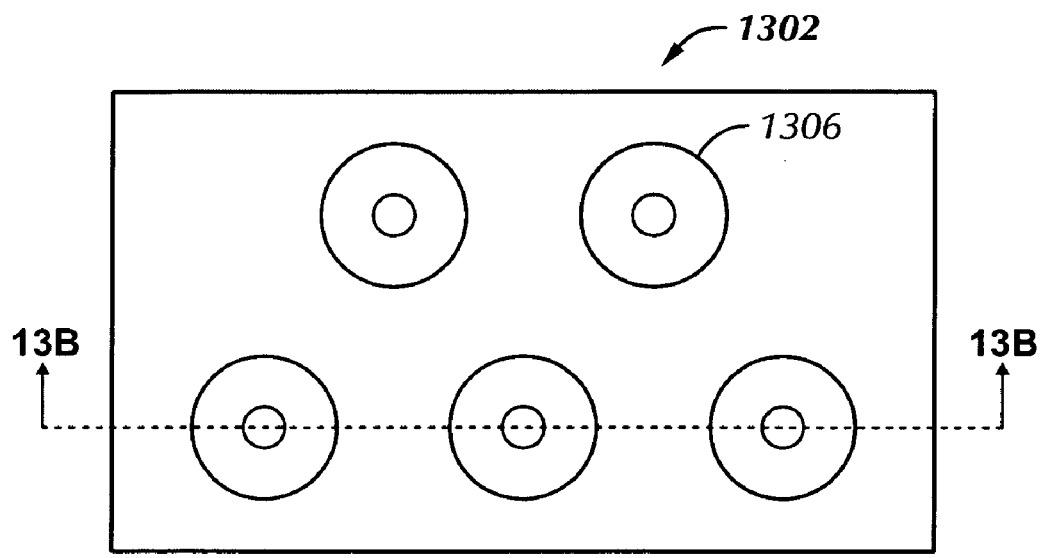
FIG. 13a is a top view of an upper press used to form a second core sheet as used in the embodiment illustrated by FIG. 11.

FIG. 13a is a top view of an upper press 1302 having a plurality of pins 1306 for forming the second core sheet 1108. As with the upper press 1202, pins 1306 may be spaced an equal distance away from each adjacent pin 1306 and partial pins that would otherwise be located at edges of the press may be eliminated. Eliminating partial pins on the edges of a press is believed to help avoid sharp edges which could cut the material being formed. Also, only five pins 1306 are shown in FIG. 13 for ease of understanding for the reader. As is appreciated, however, there is no limit as to the number of pins 1306 that can be used.

Figure 13B:
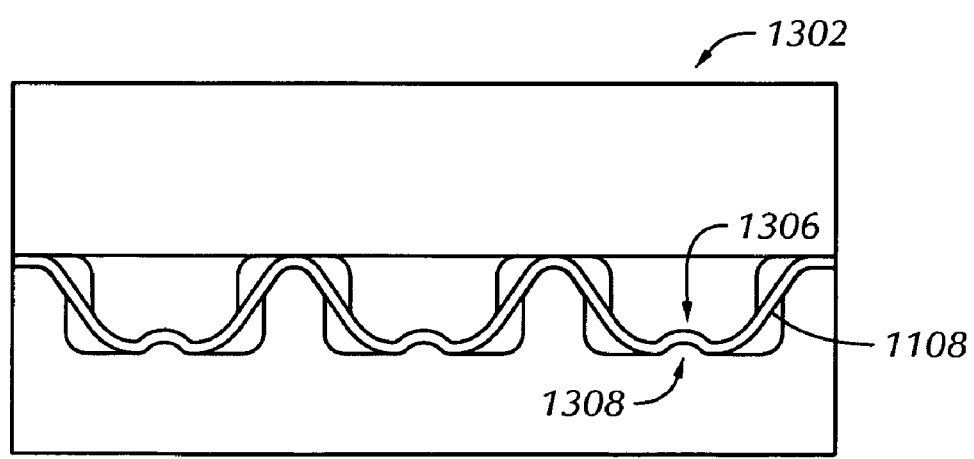
FIG. 13b is a cross-sectional view of the upper press depicted in FIG. 13a as taken along the lines 13b-13b of that figure and a lower press for forming a second core sheet according to one embodiment of the present invention.

FIG. 13b illustrates a cross-sectional side view of upper press 1302, taken along the lines 13b-13b of FIG. 13a, and lower press 1304 forming a second core sheet 1108 in accordance with an embodiment of the present invention. The upper press 1302 and lower press 1304 can be similar to the upper press 1202 and lower press 1204, respectively, with an exception being that that the upper press 1302 has indentations 1306 instead of projections 1210 and the lower press 1304 has projections 1308 instead of indentations 1214. In other words, the placement on respective presses of the projections and indentations for forming the first core sheet 1106 is reversed for forming the second core sheet 1108. Also, the indentations 1306 and projections 1308 are preferably larger than the indentations 1214 and projections 1210 to permit the bulges 1110 formed in the first sheet 1106 to sit in the dimples 1114 formed in the second sheet 1108, as shown in FIG. 11.

Figure 14:
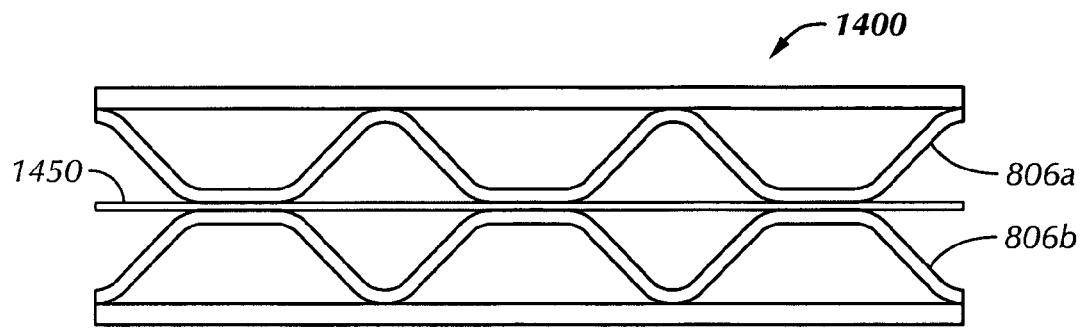
FIG. 14 is a cross-sectional view of a double cell sandwich structure comprising a middle sheet according to one embodiment of the present invention.

FIG. 14 illustrates a cross-sectional side view of a double cell sandwich structure 1600 having a middle sheet in accordance with another embodiment of the present invention. Some parts of the structure 1400 are identical to those of the previously described embodiments, and like reference numerals have been used for like parts as appropriate. As shown in FIG. 14, a middle sheet 1450 is positioned between the first core sheet 806a and the second core sheet 806b.

Figure 15:
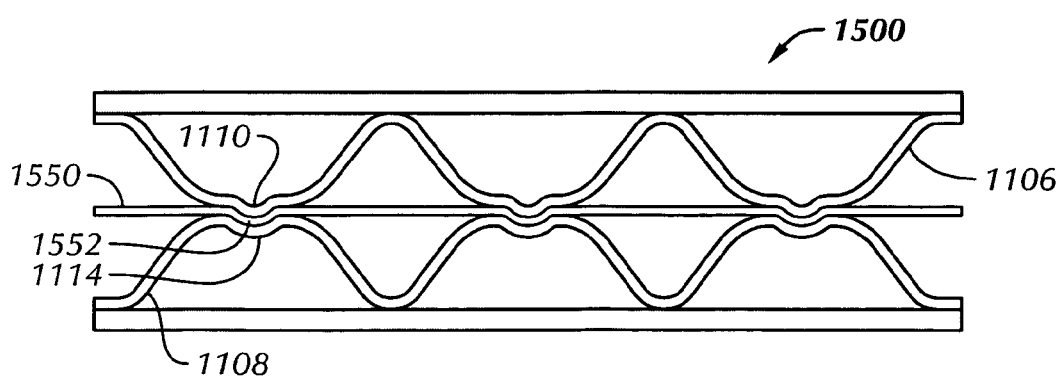
FIG. 15 is a cross-sectional view of a double cell sandwich structure comprising a middle sheet according to another embodiment of the present invention.

FIG. 15 illustrates a cross-sectional side view of a further embodiment of a double cell sandwich structure 1500 having a middle sheet, in accordance with another embodiment of the present invention. Some parts of the structure 1500 are identical to those of the previously described embodiments, and like reference numerals have been used for like parts as appropriate. As shown in FIG. 15, a dimpled middle sheet 1550 is positioned between the first core sheet 1106 and the second core sheet 1108. The dimpled middle sheet 1550 has dimples 1552 formed at locations corresponding to the locations of the bulges 1110 of the first core sheet 1106 and the dimples 1114 of the second core sheet 1108.

It is understood that sheets forming the respective structures 1400 and 1500 may be bonded or brazed together to facilitate gripping using the bonding or brazing techniques described in this disclosure.

The double cell sandwich structures provide many advantages. For example, it is believed that embodiments of double cell sandwich structures provide many of the advantages of the single cell structures; yet double cell structures can provide even more strength and further reduce dimpling and wrinkling on the surface of the structure during and after forming of the sandwich structure. Embodiments using a middle sheet between the core sheets can strengthen the structure even further.

Figure 16A:
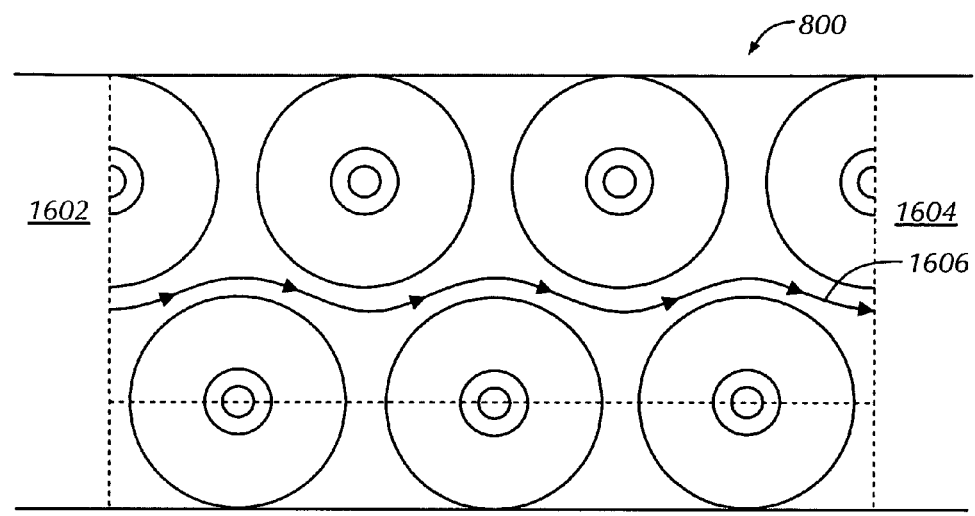
FIG. 16a is a top view of a sandwich structure depicted in FIG. 8 and adapted to support a fluid flow according to one embodiment of the invention.
Figure 16B:
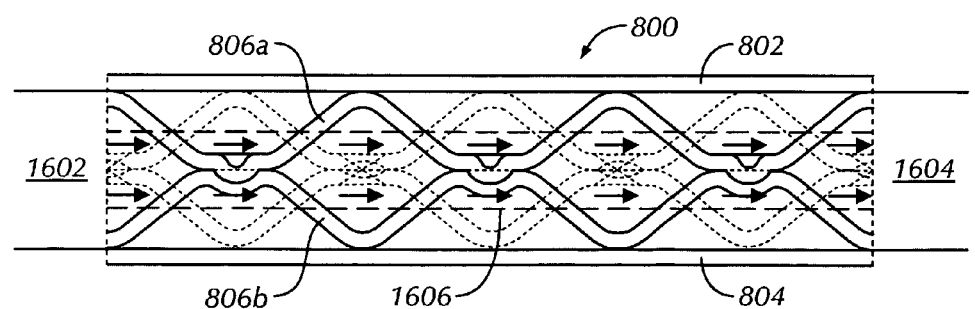

FIG. 16a is a top view of the sandwich structure 800 depicted in FIG. 8 and adapted to support a fluid flow according to one embodiment of the invention. As evidenced by the figure, a fluid enters the sandwich structure from an inlet path 1602. In preferred embodiments, the inlet path 1602 comprises any structure, component, or mechanism adapted to facilitate the transmission of the fluid to an adjoining region. This includes, without limitation, pipes, tubes, hoses, channels, and other such conduits. Note that the width of the inlet path 1602 need not necessarily equal the width of the sandwich structure 800 according to many embodiments of the present invention. Also, according to certain embodiments, multiple inlet paths 1602 may connect with the sandwich structure 800 at one or more discrete regions.

As used herein, the term "fluid" collectively refers to any liquid or gas that can flow through a conduit. The fluid may be any desired fluid. In many embodiments, the fluid comprises a coolant adapted to reduce temperatures associated with the metal sheet sandwich structure and/or one or more serviceable regions of a larger system. In some embodiments, the coolant is adapted to interact with heat generated by external forces (e.g., heat emanating from an engine) that has been thermally conducted across one or more regions of the metal sandwich structure. Note also that the coolant may comprise any solution or heat-transfer medium (e.g. water) as well as various chemical additives (e.g. corrosion inhibitors, antifreezes, etc). This includes, without limitation, solutions comprising ethylene glycol, diethylene glycol, and/or propylene glycol.

In other embodiments, the fluid comprises a refrigerant adapted to maintain at least a portion of a system under a designated temperature threshold. This may be used with various thermal devices such as refrigerators, freezers, and/or air conditioning systems. In many embodiments, the refrigerant comprises one or more compounds adapted to undergo phase changes from gas to liquid and from liquid to gas. Any chemical solution or composition may be used for this purpose, including, for example, ahydrous ammonia, liquefied propane gas, and/or Freon.

In some embodiments, the fluid comprises one or more chemical retardants (e.g. fire retardants and/or flame retardants). The retardants may comprise any substance, solution, or composition adapted to resist burning, withstand heat, and/or prevent the spread of conflagration. This includes, without limitation, fire-retardant gels, aluminum hydroxide gels, absorbent polymers, bromine and/or chlorine solutions.

In still other embodiments, the fluid comprises a fuel (e.g., automobile or aircraft) or other composition adapted to be burnt, altered or otherwise processed for the purpose of obtaining energy. Note that any fuel may be used for this purpose, including, for example, alcohol fuels (e.g. ethanol, methanol, butanol, etc.), diesel, biodiesel, gasoline, and other petroleum-derived mixtures. In some embodiments, the fuel is adapted to flow from a tank or reservoir to a fuel injector or the engine of a vehicle. In other embodiments, the fuel is adapted to service to one or more reactors.

As shown in FIG. 16a, the fluid enters the sandwich structure from an inlet path 1602 and subsequently flows through the cavities of the cells to one or more outlet paths 1604. An approximate path of maximum flow 1606 has been illustrated which can also be seen in the cross sectional view depicted by FIG. 16b. In some embodiments, the fluid is adapted to flow through the outlet path 1604 to a serviceable region (e.g., an engine compartment) and subsequently exit the system. In other embodiments, the fluid is adapted to circulate between the outlet path 1604 and the inlet path 1602. Note that one or more pumps may be used for accomplishing fluid circulation.

In preferred embodiments, the outlet path 1604 comprises any structure, component, or mechanism adapted to facilitate the transmission of fluid to an adjoining region. This includes, without limitation, pipes, tubes, hoses, channels, and other such conduits. Like the inlet path 1602, the width of the outlet path 1604 need not necessarily equal the width of the sandwich structure 800 according to many embodiments of the present invention. Also, according to some embodiments, multiple outlet paths 1604 may connect with the sandwich structure 800 at one or more discrete regions.

Figure 21A:
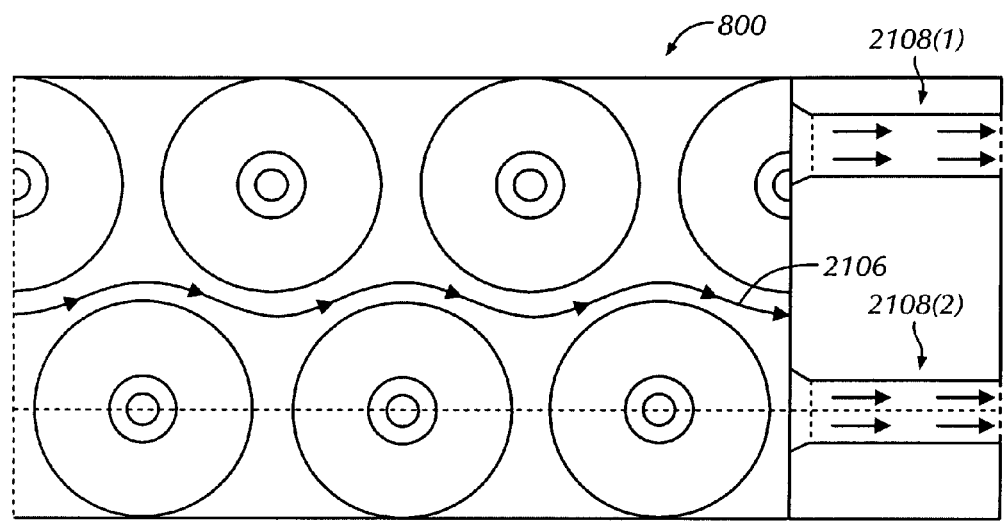
FIG. 21a is a top view of a nozzle system adapted for use with various embodiments of the present invention.
Figure 21B:
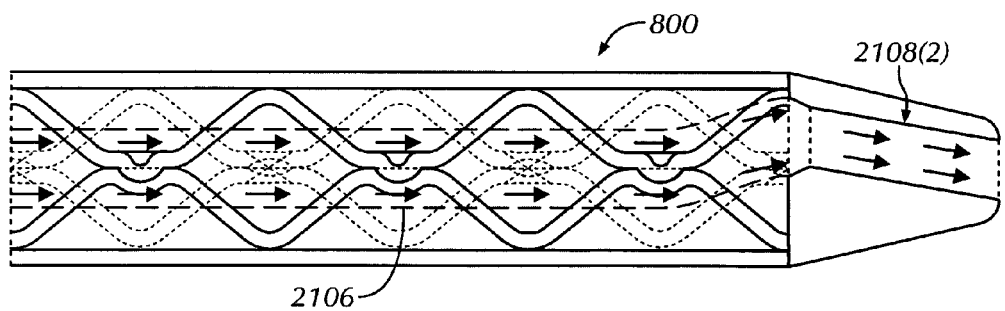

FIG. 21a is a top view of a nozzle system adapted for use with various embodiments of the present invention. FIG. 21b is a cross-sectional view of the nozzle system depicted in FIG. 21a. An approximate path of maximum flow 2106 has been indicated in both figures.

As seen in FIG. 21a, a series of nozzles 2108 are adapted to eject fluid from the system, thus serving as outlet paths for fluid flowing through the metal sheet sandwich structure. Note that any nozzle type may be used for this purpose, including, for example, jet nozzles, high velocity nozzles, spray nozzles and/or shaping nozzles.

Additionally, the fluid may be ejected from the system for any number of reasons. This includes improving fluid flow with respect to one or both surfaces of the sandwich, as a means of reducing noise, or as a means of fluid injection. Note that in some embodiments, one or more valves, gaskets, sliding seals or other such devices may be used to regulate levels of fluidic outflow.

Figure 17:
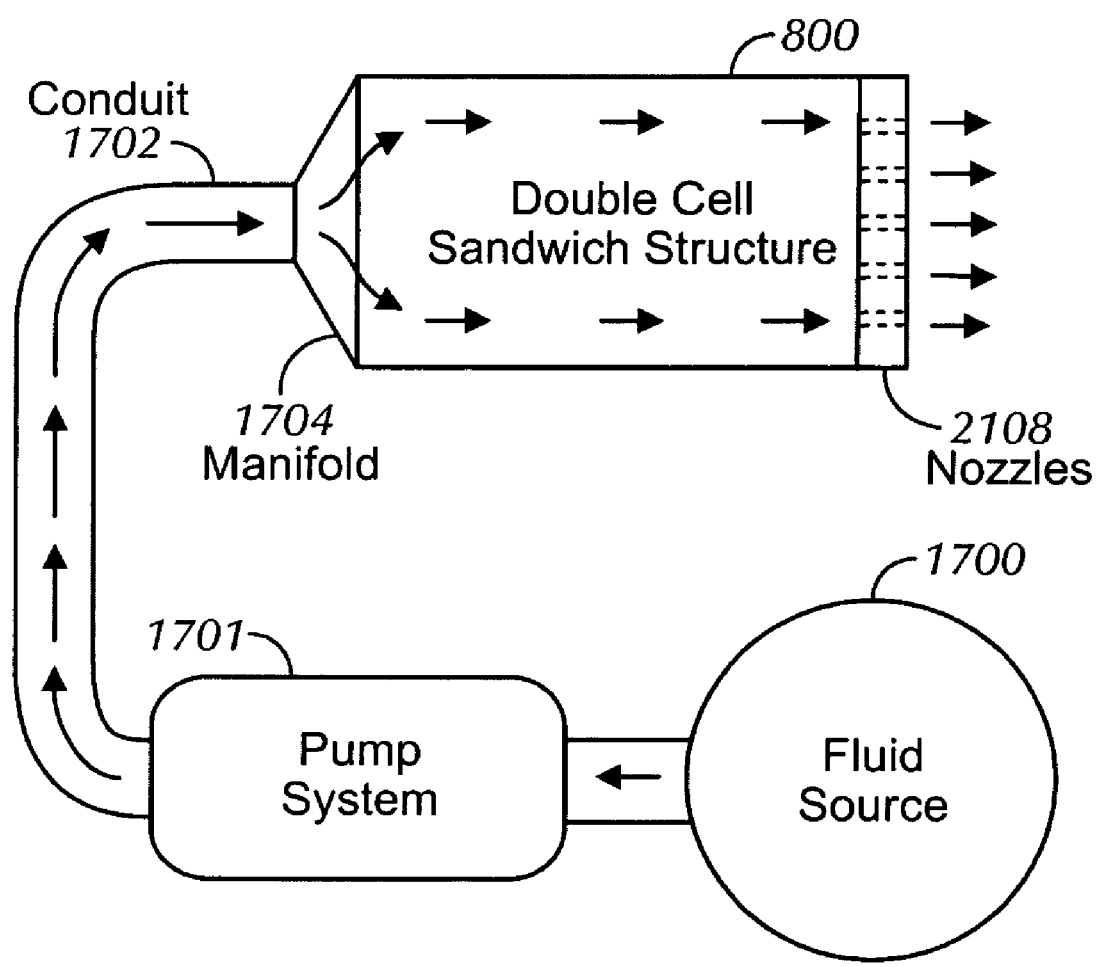
FIG. 17 is a block diagram of a system for pumping fluids through the cavities of the cells of a sandwich structure according to one embodiment of the invention.

FIG. 17 is a block diagram of a system for pumping fluids through the cavities of the cells of a sandwich structure according to one embodiment of the invention. According to the embodiment depicted by the figure, the sandwich core structure is identical to the structure 800 described above with respect to FIG. 8.

A fluid source 1700 initially provides fluid to a pump system 1701. In preferred embodiments, the pump system 1701 comprises any type of structure or mechanism adapted to convert a lower pressure flow to a higher pressure flow. Any suitable pump or combination of pumps may be used for this purpose, including, for example, rotodynamic pumps (e.g. centrifugal pumps), positive displacement pumps (e.g. reciprocating pumps), and/or kinetic pumps. Additionally, the pump system 1701 may include one or more fluid reservoirs (not shown) adapted to store a designated quantity of fluid.

As shown by the figure, the pump system 1701 pumps fluid through a conduit 1702 coupled to a first end of the sandwich structure 800 via an interfacing manifold 1704. Optionally, one or more nozzles 2108 may serve as outlet paths for ejecting fluid received from the sandwich structure 800.

Figure 18A:
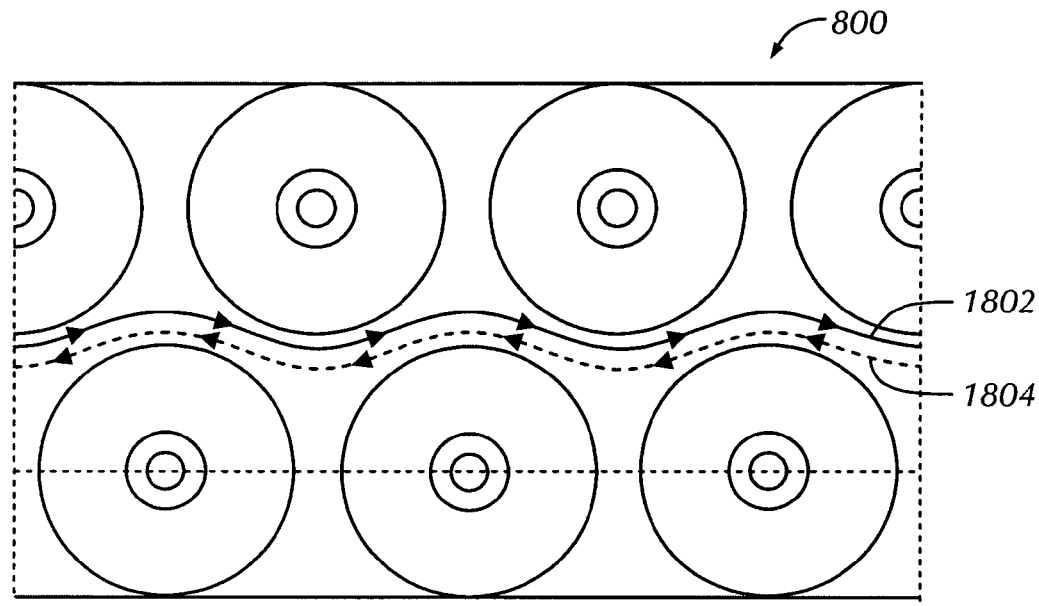
FIG. 18a is a top view of a sandwich structure adapted to support a fluid flow according to another embodiment of the present invention.
Figure 18B:
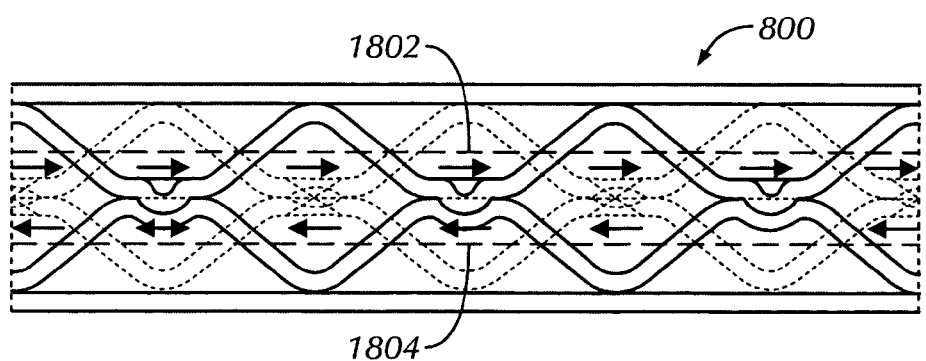

FIG. 18a is a top view of a sandwich structure adapted to support a fluid flow according to another embodiment of the present invention. FIG. 18b is a cross-sectional view of the sandwich structure depicted in FIG. 18a.

As evidenced by FIG. 18b, a fluid flows through the cavities of the top cells of the sandwich structure and returns through the cavities of bottom cells in an opposing or differing direction. Both an approximate path of maximum hot fluid flow 1802 and an approximate path of maximum cold fluid flow 1804 have been indicated in the figures.

In many embodiments, the fluid flowing in the first direction possesses different characteristics, properties, or features than the fluid flowing in the second direction. For example, in the embodiment depicted by FIGS. 18b, the fluid flowing through the cavities of the top cells possesses a higher temperature than the fluid flowing through the cavities of the bottom cells.

In other embodiments, the fluids also comprise different densities, viscosities, and/or chemical compositions. For example, fluid may be treated, filtered, or processed at a remote region of a system and subsequently returned via the same sandwich structure. Note that in some embodiments, the fluid flows are insulated from each other and adapted to flow through separate transmission channels. For example, in one embodiment, a fifth layer of metal situated at the core of the sandwich divides the set of top cavities from the set of bottom cavities, thus separating the flows. In other embodiments, the fluids may interact with each other at one or more interfacing regions before flowing to a corresponding outlet path.

In some embodiments, different fluids (e.g. a fuel and an oxidizer) flow in the same direction through cavities of the top and/or bottom cells of the structure. In certain variants, the different fluids enter a respective layer of the metal sandwich structure from separate inlet regions. In other variants, the fluids enter the structure at the same inlet region but arrive there via separate conduits.

Figure 19:
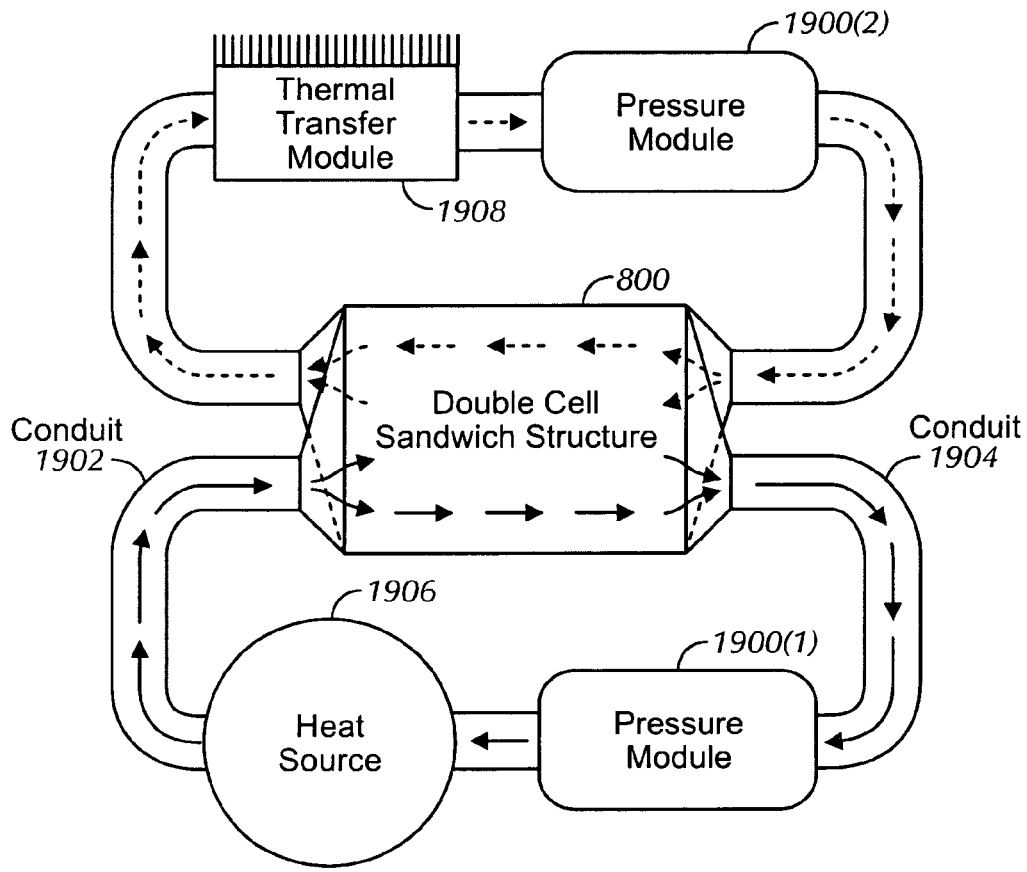
FIG. 19 is a block diagram of a heat exchanger according to one embodiment of the present invention.

FIG. 19 is a block diagram of a heat exchanger according to one embodiment of the present invention. A set of pressure modules 1900(1) and 1900(2) are each adapted to convert a low pressure flow to a high pressure flow. Any means or mechanism known in the art can be used for accomplishing this purpose, including, for example, pumps (e.g. rotodynamic, positive displacement, kinetic, etc.) and/or compressors (e.g. reciprocating, rotary, centrifugal, axial, etc.). Note that the selection of pressure modules 1900 may depend in part upon the substance or substances expected to flow through that respective module (e.g., liquid or gaseous substances).

The pressure module 1900(1) is adapted to transmit a first substance toward a heat source 1906 or heat emanating device (e.g. the engine of an automobile). In many embodiments, the first substance comprises a solution or composition adapted to receive heat from the heat source 1906 (for example, coolant and/or antifreeze). The first substance is then transmitted via a first conduit 1902 to the upper layer of the metal sandwich sheet structure 800.

A second substance flowing in a different direction is adapted to receive heat from the first substance, thereby cooling it. In some embodiments, the second substance directly interacts with the first substance at a number of designated regions. In other embodiments, the substances are divided so that they never directly interact. This may be accomplished in a variety of means, for example, as by one or more metal sheets interspersed between the higher and lower layers of the metal sandwich structure (e.g., at the core of the structure). In preferred embodiments, the divider is selected so as maximize surface area between the two substances, while minimizing resistance to flows within the exchanger.

As the second substance exits the sandwich structure 800 via the lower layer, it is transmitted to a thermal transfer module 1908. Note that any type of device adapted to transfer thermal energy may be used for this purpose, including, for example, radiators and/or convection devices. In preferred embodiments, the thermal transfer module 1908 absorbs heat within the second substance and emits the heat externally. After the second substance is cooled, it is recycled through the metal sandwich sheet by the pressure module 1900(2). The first substance likewise returns to the heat source via the conduit 1904, and the process subsequently repeats.

Figure 20:
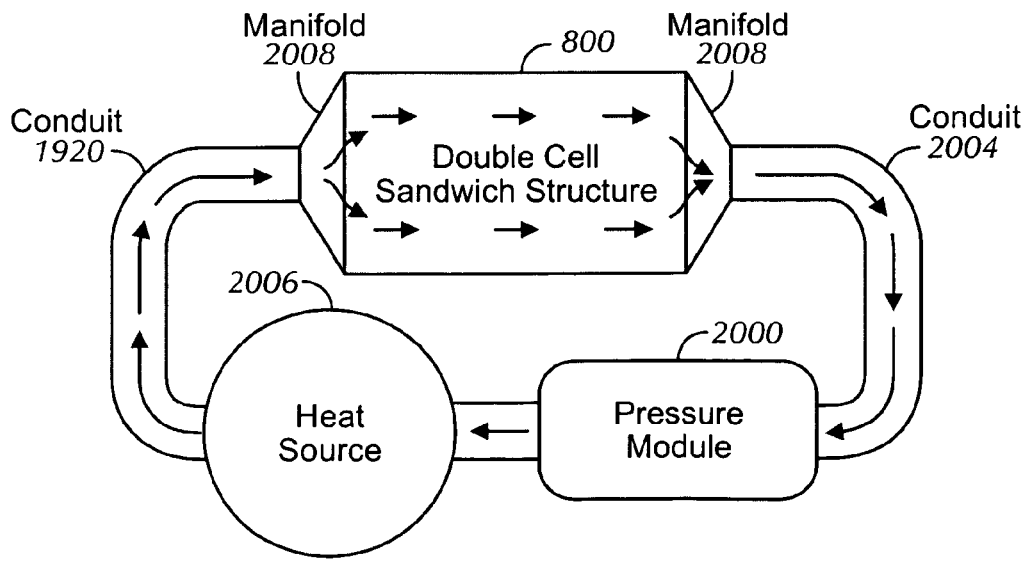
FIG. 20 is a block diagram of a thermal transmission system according to one embodiment of the present invention.

FIG. 20 is a block diagram of a thermal transmission system according to one embodiment of the present invention. As before, a pressure module 2000 is adapted to convert a low pressure flow to a high pressure flow. Any means or mechanism known in the art may be used for accomplishing this purpose, including, for example, pumps (e.g. rotodynamic, positive displacement, kinetic, etc.) and/or compressors (e.g. reciprocating, rotary, centrifugal, axial, etc.). Note that the selection of the pressure module 2000 may depend in part upon the substance or substances expected to flow through that respective module (e.g., liquid or gaseous substances).

The substance is transmitted toward a heat source 2006 or heat emanating device (e.g. the engine of an automobile). In preferred embodiments, the substance comprises a solution or composition adapted to receive heat from the heat source 2006 (for example, coolant and/or antifreeze) for transmission to a remote region. The substance is then transmitted via a first conduit 2002 to the metal sandwich structure 800 via an interfacing manifold 2008.

In many embodiments, the metal sheet sandwich structure is adapted to absorb heat stored within the transmitted substance as it flows to a distal region of the sandwich structure. In many embodiments, the absorbed heat is thermally conducted for external emissions. In this regard, the metal sheet sandwich structure 800 serves to transfer heat out of the system, thus acting as a radiator. As the substance is cooled, it returns to the pressure module 2000 via a second conduit 2004, and the process then repeats.

Various preferred embodiments of the invention have been described above. However, it is understood that these various embodiments are exemplary only and should not limit the scope of the invention as recited in the claims below. Various modifications of the preferred embodiments described above can be implemented by those of ordinary skill in the art, without undue experimentation. These various modifications are contemplated to be within the spirit and scope of the invention as set forth in the claims below.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of directing fluid through an apparatus, comprising:
   directing a fluid through at least one inlet located at a first end of a metal sheet sandwich structure; and
   ejecting the fluid out of at least one outlet located at a second end of the metal sheet sandwich structure;
   wherein the metal sheet sandwich structure is a non-honeycomb core with multiple directions of corrugation and having a first core and a different second core each having a plurality of bonding lands, the first and second cores each being formed from a continuous sheet of material, a first outer sheet coupled to the first core and a second outer sheet coupled to the second core, at least one of the first and second cores having a channel that couples the inlet to the outlet and
   at least one formed metal core layer comprises two formed metal core layers sandwiched between the two outer metal sheet layers and a middle metal sheet layer located between the two formed metal core layers.

2. The method of claim 1, wherein said act of directing the fluid comprises pumping the fluid.

3. The method of claim 1, wherein said act of directing the fluid comprises compressing the fluid.

4. The method of claim 1, wherein the fluid comprises fuel.

5. The method of claim 1, wherein the fluid comprises fire retardant.

6. The method of claim 1, wherein the fluid comprises coolant.

7. The method of claim 1, wherein the fluid comprises oxygen.

8. The method of claim 1, wherein the at least one formed metal core layer is coupled to at least one of said two outer metal sheet layers by a process of brazing.

9. The method of claim 1, wherein the at least one formed metal core layer is coupled to at least one of said two outer metal sheet layers by a process of bonding.

10. The method of claim 1, wherein said at least one formed metal core layer is coupled to at least one of said two outer metal sheet layers by a process of welding.

11. The method of claim 1, wherein said at least one formed core metal sheet comprises two formed core metal sheets sandwiched between the two outer metal sheet layers.

* * * * *